United States Patent
Dirac et al.

(10) Patent No.: US 10,970,629 B1
(45) Date of Patent: Apr. 6, 2021

(54) ENCODINGS FOR REVERSIBLE SPARSE DIMENSIONALITY REDUCTION

(71) Applicant: Amazon Technologies, Inc., Seattle, WA (US)

(72) Inventors: Leo Parker Dirac, Seattle, WA (US); Oleg Rybakov, Seattle, WA (US); Vijai Mohan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 837 days.

(21) Appl. No.: 15/442,453

(22) Filed: Feb. 24, 2017

(51) Int. Cl.
*G06N 3/08* (2006.01)
*G06N 3/04* (2006.01)

(52) U.S. Cl.
CPC ............ *G06N 3/08* (2013.01); *G06N 3/04* (2013.01)

(58) Field of Classification Search
CPC ..................................... G06N 3/08; G06N 3/04
See application file for complete search history.

(56) References Cited

U.S. PATENT DOCUMENTS

| | | | | | |
|---|---|---|---|---|---|
| 5,317,676 | A | * | 5/1994 | Austvold | G06N 3/105 706/44 |
| 6,311,173 | B1 | * | 10/2001 | Levin | G06F 17/18 706/21 |
| 2005/0033803 | A1 | * | 2/2005 | Vleet | G06Q 30/02 709/203 |
| 2005/0265618 | A1 | * | 12/2005 | Jebara | G06K 9/00275 382/243 |
| 2010/0191682 | A1 | * | 7/2010 | Takamatsu | G06Q 30/02 706/12 |
| 2011/0078099 | A1 | * | 3/2011 | Weston | G06K 9/6231 706/12 |
| 2015/0269609 | A1 | * | 9/2015 | Mehanian | G06Q 30/0246 705/14.45 |
| 2016/0321541 | A1 | * | 11/2016 | Liu | G06N 3/0454 |
| 2017/0323199 | A1 | * | 11/2017 | Wu | G06F 16/00 |

OTHER PUBLICATIONS

Hao Wang, "Collaborative Deep Learning for Recommended Systems", Aug. 10-13, 2015, KDD '15 Proceedings of the 21th ACM SIGKDD International Conference on Knowledge Discovery and Data Mining, pp. 1235-1244. (Year: 2015).*

Zhang, Zhenghao. "Analog Bloom Filter: Efficient simultaneous query for wireless networks." 2012 IEEE Global Communications Conference (GLOBECOM). IEEE, 2012. (Year: 2012).*

(Continued)

*Primary Examiner* — Daniel T Pellett
(74) *Attorney, Agent, or Firm* — Knobbe, Martens, Olson & Bear, LLP

(57) ABSTRACT

The present disclosure is directed to reducing model size of a machine learning model with encoding. The input to a machine learning model may be encoded using a probabilistic data structure with a plurality of mapping functions into a lower dimensional space. Encoding the input to the machine learning model results in a compact machine learning model with a reduced model size. The compact machine learning model can output an encoded representation of a higher-dimensional space. Use of such a machine learning model can include decoding the output of the machine learning model into the higher dimensional space of the non-encoded input.

20 Claims, 7 Drawing Sheets

(56) References Cited

OTHER PUBLICATIONS

Bloom, Burton H. "Space/time trade-offs in hash coding with allowable errors." Communications of the ACM 13.7 (1970): 422-426. (Year: 1970).*

Rothenberg, Christian Esteve, et al. "The deletable Bloom filter: a new member of the Bloom family." IEEE Communications Letters 14.6 (2010): 557-559. (Year: 2010).*

Bengio, Y., et al. (2003). Quick training of probabilistic neural nets by importance sampling http://www.iro.umontreal.ca/~lisa/pointeurs/senecal_aistats2003.pdf.

Bloom, B.H. (Jul. 1970). Space/time trade-offs in hash coding with allowable errors. Communications of the ACM 13 (7): 422426, doi:10.1145/362686.362692 https://www.cs.upc.edu/~diaz/p422-bloom.pdf.

Bromley, J., et al. (May 1994). Signature Verification Using a "Siamese" Time Delay Neural Network http://yann.lecun.com/exdb/publis/pdf/bromley-94.pdf.

Chen, W., et al. (Jul. 2015). Compressing neural networks with the hashing trick http://proceedings.mlr.press/v37/chenc15.html.

Cheng, Y., et al. (Feb. 2015). An exploration of parameter redundancy in deep networks with circulant projections. arXiv:1502.03436.

Cisse, M., et al. (Apr. 2014). Robust Bloom Filters for Large MultiLabel Classification Tasks. NIPS Proceedings http://papers.nips.cc/paper/5083-robust-bloom-filters-for-large-multilabel-classification-tasks.

Courbariaux, M., et al. (Feb. 2015). Low precision storage for deep learning. arXiv:1412.7024.

Courbariaux, M. et al. (Sep. 2015). Training deep neural networks with low precision multiplications. arXiv:1412.7024.

Elkahky, A., et al. (May 2015). A Multi-View Deep Learning Approach for Cross Domain User Modeling in Recommendation Systems http://research.microsoft.com/pubs/238334/frp1159-songA.pdf.

Gupta, S. et al. (Feb. 2015). Deep learning with limited numerical precision. arXiv:1502.02551.

Han, S. et al (Feb. 2016). Deep Compression: Compressing Deep Neural Networks with Pruning, Trained Quantization and Huffman Coding. arXiv:1510.00149.

Ji, S. et al. (Mar. 2016). Blackout: Speeding up recurrent neural network language models with very large vocabularies, ICLR 2016 http://arxiv.org/pdf/1511.06909.pdf.

Kingma, D. et al. (Dec. 2014). Adam: A method for stochastic optimization. http://arxiv.org/abs/1412.6980.

Lecun, Y., et al. (1990). Optimal brain damage. In Advances in Neural Information Processing Systems, pp. 598-605. Morgan Kaufmann.

Morin, F.et al, (Jan. 2005). Hierarchical Probabilistic Neural Network Language Model http://www.iro.umontreal.ca/~lisa/pointeurs/hierarchical-nnlm-aistats05.pdf.

Novikov, A., et al. (Dec. 2015). Tensorizing neural networks. In Advances in Neural Information Processing Systems, 28 NIPS.

Srivastava, N., et al. Dropout: A Simple Way to Prevent Neural Networks From Overfitting. Journal of Machine Learning Research, 15, (Jun. 2014) pp. 1929-1958 http://jmlr.org/papers/v15/srivastava14a.html.

Sutskever, I., et al. (Jun. 2013). On the importance of initialization and momentum in deep learning. Proceedings of the 30th International Conference on Machine Learning, Atlanta, Ga., USA, Jun. 2013. JMLR: W&CP vol. 28 http://jmlr.org/proceedings/papers/v28/sutskever13.pdf.

Yang, Z., et al. (Jul. 2015). Deep fried convnets. arXiv:1412.7149.

\* cited by examiner

ENCODINGS FOR REVERSIBLE SPARSE DIMENSIONALITY REDUCTION

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. The parameters of a NN can be set in a process referred to as training.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
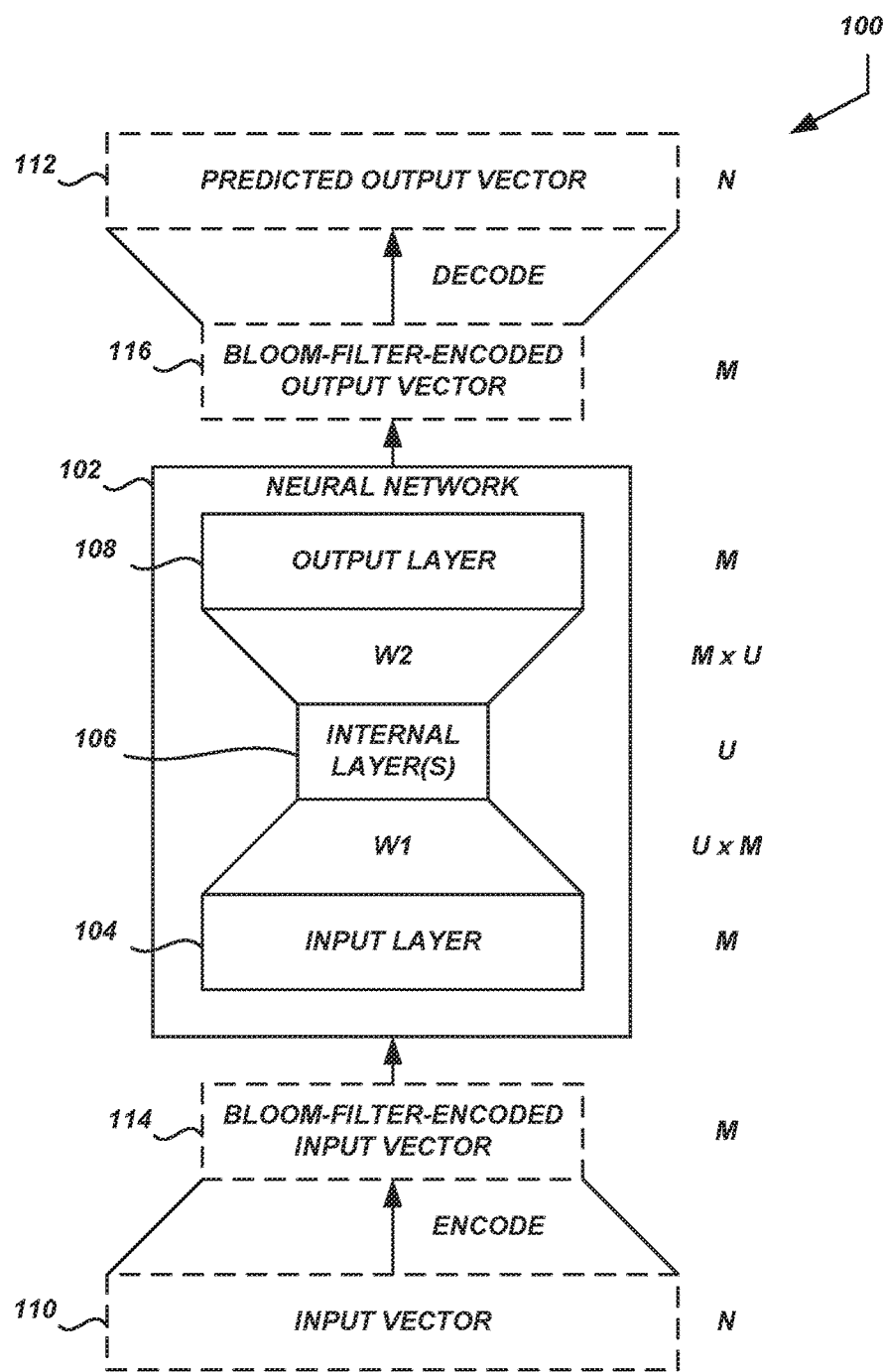
FIG. 1 is a diagram of an illustrative artificial neural network architecture with Bloom filter encoding according to some embodiments.

The present disclosure is directed to embodiments of training and using machine learning models that output encoded or otherwise reduced-dimensional representations of sparse high-dimensional output. Examples of machine learning models that may be used with aspects of this disclosure include classifiers and non-classification machine learning models, artificial neural networks (NNs), linear regression models, logistic regression models, decision trees, support vector machines (SVMs), Naïve or a non-Naïve Bayes network, k-nearest neighbors (KNN) models, k-means models, clustering models, random forest models, or any combination thereof. In some embodiments, machine learning models can be trained with training data encoded using a probabilistic data structure, such as a Bloom filter or count-min sketch, with a plurality of mapping functions, such as hash functions. Machine learning models trained with such encoded data and designed to produce encoded output can be more compact and require fewer computing resources to generate and use than machine learning models trained with non-encoded data. For example, machine learning models trained with encoded data and designed to produce encoded output may require less storage space, require less bandwidth to be transmitted, require less memory during training, require fewer processors during training, and may provide an improvement in performance due to fewer calculations being performed overall than conventionally-trained machine learning models or machine learning models otherwise designed to directly produce sparse, high-dimensional output. In some embodiments, machine learning models trained with encoded data and designed to produce encoded output may have accuracy comparable to, or even better than, the accuracy of conventional machine learning models. Such compact machine learning models trained with encoded data and designed to produce encoded output may be used in a variety of machine learning applications and other systems, including but not limited to: item recommendation generation, automatic speech recognition, facial recognition, handwriting recognition, and image recognition. For example, outputs of such machine learning models, after decoding, may be used for generating recommendations of items that a user may wish to view, obtain, access, etc. based on the user's prior actions regarding other items.

Some aspects of the present disclosure relate to generating and training a machine learning model with encoded training data and without reducing (or substantially reducing) the accuracy of the machine learning model. In some embodiments, training data input vectors and reference data output vectors may be encoded using a probabilistic data structure (such as a Bloom filter or a count-min sketch) with a plurality of mapping functions (such as hash functions) to generate encoded training data input vectors and encoded reference data output vectors. Using the machine learning model, encoded training data output vectors may be generated from the encoded training data input vectors. In some embodiments, parameters of the machine learning model may be adjusted based on the differences between encoded reference data output vectors and encoded training data output vectors. The differences may be determined using a loss function, such as a cross-entropy loss function. Thus, training occurs in an encoded, reduced-dimensional space rather than the sparse, high-dimensional value space of the non-encoded reference data output vectors. Because the dimensionality of the encoded vectors is smaller than the dimensionality of the non-encoded vectors, the dimensionality of the input and output layers of the machine learning model decreases. This reduction in the size of the input and output layers of the machine learning model has the effect of reducing the total amount of data that defines the machine learning model, because there is a corresponding reduction in the total number of weights that must be generated, trained, and stored.

Additional aspects of the present disclosure relate to methods of using a machine learning model trained to generate encoded representations of sparse, high-dimensional output. In some embodiments, a high-dimensional input vector may be encoded to generate an encoded, reduced-dimensional input vector using a probabilistic structure with a plurality of mapping functions. In some embodiments, the high-dimensional input vector may correspond to a vector of binary values, with each binary value indicating whether a particular user performed a certain interaction with respect to a particular item (e.g., whether the user purchased the item). If the input vector is designed to represent interactions of a single user with respect to each of 1 billion items, then the input vector would have 1 billion binary value dimensions. Such a vector may be quite sparse (e.g., the vector may have a substantial majority of "0" values, such as greater than about 95% "0" values or greater than about 99% "0" values). From this sparse, high-dimensional input vector, an encoded, reduced-dimensional input vector may be generated (e.g., an encoded input vector having about 10,000 dimensions). An encoded output vector may be generated using the machine learning model and the encoded input vector. In some embodiments, the encoded output vector may be decoded into a higher-dimensional output vector using the mapping functions. For example, each element of the output vector may correspond to a sum, product, or other result computed using the encoded output vector and the mapping functions. Thus, an output vector with a value for each item available for purchase may include 1 billion different values computed from a 10,000 dimension encoded output vector. Each element of the output vector can be or represent a predicted probability of the user purchasing the corresponding item during a subsequent time period. For example, if the probability has a value greater than a threshold, then the user has a high probability of purchasing the item in the subsequent time period. As another example, the items associated with the top n values (where n is some positive integer) in the output vector may be the items most likely to be purchased by the user. Such an item or items can be recommended to the user.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, certain aspects of the disclosure will be described using a particular machine learning model, such as a NN, for purposes of illustration only. For brevity, these aspects may not be described with respect to each possible machine learning model that may be used. In practice, however, many or all of the aspects of the disclosure may apply to other machine learning models, including but not limited to those described herein. As another example, although certain embodiments are described with respect to using Bloom filter encodings of input and/or output vectors, other types of encoding may be used (e.g., count-min sketches). As yet another example, although certain embodiments are described using input vectors encoded in the same manner as output vectors (e.g., both input vectors and output vectors being encoded using a Bloom filter), the input and output vectors may be encoded using different methods, or the input vectors may not be encoded at all.

Example Artificial Neural Network

Generally described, NNs, including but not limited to deep neural networks ("DNNs"), have multiple layers of nodes. Illustratively, a NN may include an input layer, an output layer, and any number of intermediate, internal, or "hidden" layers between the input and output layers. The individual layers may include any number of separate nodes.

Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of a matrix of input vectors (e.g., a batch of training data input vectors), the NN may perform a "forward pass" to generate a matrix of output vectors. The input vectors may each include n separate data elements or "dimensions," corresponding to the n nodes of the NN input layer (where n is some positive integer). Each data element may be a value, such as a floating-point number or integer. The forward pass includes multiplying the matrix of input vectors by a matrix representing the weights associated with connections between the nodes of the input layer and nodes of the next layer, and applying an activation function to the results. The process is then repeated for each subsequent NN layer. Some NNs have hundreds of thousands or millions of nodes, and millions of weights for connections between the nodes of all of the adjacent layers. Such NNs may consume a large amount of space when stored, a large amount of bandwidth when transmitted, a large amount of memory when trained, and a large amount of processing resources when used due to the large number of calculations to be performed. In some cases, a NN may be so large that it does not fit on a single processor (e.g., it may require more memory than is available to a single processor). For example, if the input layer and the output layer have more than 2,000,000 nodes and each of two internal layers has 1,024 nodes, then the NN may not fit into a processor with 12 gigabytes ("GB") of available memory for use by the processor. The NN would then typically be split up and distributed among multiple processors. Such distributed NNs introduce additional complexities in terms of the hardware and software required to train and use the NNs.

FIG. 1 is a diagram of an illustrative artificial neural network architecture 100 with Bloom filter encoding that may be used in some embodiments. As shown, the example NN 102 has an input layer 104 with a plurality of nodes, one or more internal layers 106 with a plurality of nodes, and an output layer 108 with a plurality of nodes. The specific number of layers shown in FIG. 1 is illustrative only, and is not intended to be limiting. In some NNs, different numbers of internal layers and/or different numbers of nodes in the input, internal, and/or output layers may be used. For example, in some NNs the layers may have hundreds or thousands of nodes. As another example, in some NNs there may be 1, 2, 4, 5, 10, or more internal layers. In some implementations, each layer may have the same number or different numbers of nodes. For example, the input layer 104 or the output layer 108 can each include more nodes than the internal layers 106. The input layer 104 and the output layer 108 can include the same number or different number of nodes as each other. The internal layers 106 can include the same number or different numbers of nodes as each other.

In some embodiments, as shown, the input vectors 110 and/or the output vectors 112 may each include N separate data elements or "dimensions" (where N is some positive integer). The NN input layer 104 may include M nodes of the NN input layer (where M is some positive integer). In some embodiments, as shown in FIG. 1, an input vector 110 can be encoded with a Bloom filter (or another probabilistic data structure such as count-min sketch) to generate a Bloom-filter-encoded input vector 114 with M elements, corresponding to M nodes of the NN input layer 104. The number of elements of the Bloom-filter-encoded input vector 114, M, is smaller than the number of elements of the input vector 110, N. Accordingly, the Bloom-filtered-encoded input vector 114 is a compressed representation of the input vector 110 in a Bloom filter space.

In some embodiments, the elements of the input vector 110 can include a purchase history of a user. For example, the elements of the input vector 110 can be 0 or 1, where 0 represents the user not having purchased an item during a time period and 1 represents the user having purchased the item during the time period. The purchase history of the user during the time period, such as a day, a week, a month, a year, or several years, can be used to determine a probability of the user purchasing items during a subsequent time period, which may be the same length or of a different length than the purchase history time period. As another example, the elements of the input vector 110 can be 0 or a positive integer, where 0 represents the user not having purchased an item during a time period and a positive integer represents a number of times that the user purchased the item during the time period. In some embodiments, the elements of the input vector 110 can include features of items purchased by the user. For example, features of items purchased can include a numeric or alphanumeric identifier of the items, a description of the items, the cost of the items, a life expectancy of the items, a category of the items, whether the items are fungible, and/or other characteristics of the items. In some embodiments, the elements of the input vector 110 can include the attributes of the user. For example, the attributes can include the user's age, gender, geographic location, interests, etc. In some embodiments, the input vector 110 can include information other than the specific examples described herein, some combination of different types of information, etc.

An output vector 112 can include N elements. In some embodiments, the output vector 112 may be determined by decoding a Bloom-filter-encoded output vector 116. Each data element of the output vector 112 may be a value, such as a floating-point number or integer. In some embodiments, the elements of the output vector 112 can correspond to a probability of the user purchasing items during a subsequent time period. For example, the elements of the output vector 112 can be 0 or any positive number, representing or otherwise associated with the predicted probability of the user purchasing an item during the subsequent time period. In this example, if the value is greater than some predetermined or dynamically determined threshold, a computing system using the output of the NN 102 can predict that the user will purchase the item during the subsequent time period. In some embodiments, the items associated with the top n values (where n is some positive integer, ratio, or percentage) can be selected, based on an ordering of the items by their respective output values.

Input to a NN, such as the NN 102 shown in FIG. 1, occurs at the input layer 104. A single input to the NN 102 may take the form of an input vector with M data elements, where M is the number of nodes in the input layer 104. In some embodiments, the individual data elements may be numbers, such as integer numbers, that have been generated using a probabilistic data structure, such as a Bloom filter or count-min sketch, with a plurality of mapping functions. In some cases, multiple input vectors may be input into—and processed by—the NN 102 at the same time. For example, when the NN 102 is used in prediction, a set of input vectors (e.g., a "mini batch") may be arranged as an input matrix. In this example, each row of the input matrix may correspond to an individual encoded training data input vector, and each column of the input matrix may correspond to an individual node of the first layer 104. The data element in any given input vector for any given node of the first layer 104 may be located at the corresponding intersection location in the input matrix.

The connections between individual nodes of adjacent layers are each associated with a trainable parameter, or weight, that is applied to the value passed from the prior layer node to the activation function of the subsequent layer node. The weights associated with the connections from the input layer 104 to the internal layer 106 it is connected to may be arranged in a weight matrix W1 with a dimension of U×M, where U denotes the number of nodes in an internal layer 106 and M denotes the dimensionality of the input layer 104. The individual rows in the weight matrix W1 may correspond to the individual nodes in the input layer 104, and the individual columns in the weight matrix W1 may correspond to the individual nodes in the internal layer 106. The weight associated with a connection from any node in the input layer 104 to any node in the internal layer 106 may be located at the corresponding intersection location in the weight matrix. The weights associated with the connections from the internal layer 106 (or, if the NN 102 has multiple internal layers, the internal layer that is adjacent to the output layer 108) to the output layer 108 may be arranged in a weight matrix W2, similar to the weight matrix W1. The weight matrix W2 has a dimension of U×M, where U denotes the number of nodes in the internal layer 106 and M denotes the dimensionality of the output layer 108. The model size of the NN 102, in terms of the number of weights, may be 2×U×M. In contrast, the model size of a NN with the input vector 110 and the output vector 112 as its input and output may be 2×U×N. For example, if the dimensionality of the input vector is 100,000 and the dimensionality of the Bloom-filter-encoded input vector is 1,000, the model size of the NN 102 may be reduced by a factor of 100 using Bloom filter encoding.

In one embodiment, the input vector 110 would be provided to a computer processor that stores or otherwise has access to the weight matrix W1. The processor would then multiply the Bloom-filter-encoded input vector 114 by the weight matrix W1 to produce an intermediary vector. The processor may adjust individual values in the intermediary vector using an offset or bias that is associated with the internal layer 106 (e.g., by adding or subtracting a value separate from the weight that is applied). In addition, the processor may apply an activation function to the individual values in the intermediary vector (e.g., by using the individual values as input to a sigmoid function or a rectified linear unit (ReLU) function). The processor may multiply the intermediary vector by the weight matrix W2 to generate the Bloom-filter-encoded output vector 116. The processor may adjust individual values of the multiplication result using an offset or bias that is associated with the output layer 106 to generate the Bloom-filter-encoded output vector 116. In addition, the processor may apply an activation function to the individual values of the multiplication result, after applying an offset or bias to each individual value of the multiplication result, if any, to generate the Bloom-filter-encoded output vector 116. Elements of the Bloom-filterencoded output vector 116 may be real numbers in the range [0, 1]. Such real numbers may also be referred to as analog values.

Generally described, a Bloom filter is data structure with a plurality (k, where k is some positive integer) of hash functions which allows for space-efficient representation of set membership. In some embodiments, a plurality of hash functions of a Bloom filter, for example seven hash functions of a Bloom filter, may be used to encode the N elements of an input vector 110 into a Bloom-filter-encoded input vector 114 with M elements, where M is smaller than N. For example, an input vector with 100,000 elements may be encoded into a Bloom-filter-encoded input vector with 1,000 elements using the seven hash functions of a Bloom filter. To achieve this efficiency in representation, hashes computed using each of the plurality of k hash functions can be determined for the input vector. A Bloom filter encoding may map every input vector 110 to a Bloom-filter-encoded input vector 114 may be represented by equation [1] below:

$$H_i: x \rightarrow \{1 \ldots M\}, i \in \{1 \ldots k\}, \quad [1]$$

wherein $H_i$ denotes the ith hash function and x denotes the input vector 110.

Non-limiting examples of the hash functions of a Bloom filter include a string-based hash function (such as MD5), a non-cryptographic hash function (such as a MurmurHash), or any combination thereof. In some embodiments, a string-based hash function like MD5 can be used to derive the plurality of k hash functions by concatenating the hash function's family identifier with a representation of the input vector 110, separated by an arbitrary delimiter as shown in equation [2] below:

$$H_i(x) = MD5\{i+:+x\} \bmod M, \quad [2]$$

where $H_i$ denotes the ith hash function, x denotes the input vector 110, and mod represents the remainder after division. Thus, $H_i(x)$ is in the range of [0, M−1]. For example, if M equals 1,000 and a Bloom filter includes seven hash functions, then seven elements of the 1,000 elements of the encoded input vector may have values of one and the remaining elements of the encoded input vector each have a value of zero. The position of each of the at most seven elements may be determined using one of the seven hash functions.

In some embodiments, as shown in equation [2], the input vector may be numeric or any data structure. Thus, maintaining a lookup index may be unnecessary. To encode the input vector 110, all k hash functions may be evaluated, and the resulting k bits (out of M bits) may all be set to 1. Encoding the input vector 110 into the Bloom-filter-encoded input vector 114 may be represented as a matrix multiplication with an encoding matrix shown in equation [3] blow:

$$B \in \{0, 1\}^{M,N} \quad [3]$$
$$B_{a,b} = \begin{cases} 1 & \text{if } H_i(x_b) = a \text{ for any } i \in \{1 \ldots k\} \\ 0 & \text{otherwise} \end{cases},$$

where B denotes an encoding matrix with M rows and N columns, $B_{a,b}$ denotes the value of the encoding matrix B at ath row and bth column, $H_i$ denotes the ith hash function, and $x_b$ denotes the value of the bth element of the input vector x.

In some embodiments, to decode the Bloom-filter-encoded output vector 116 into the output vector 112, the Bloom-filter-encoded output vector 116 may be mapped from its M-dimensional value space to the output vector 112 in an N-dimensional value space. For example, to decode the Bloom-filter-encoded output vector 116, the k hash functions may be evaluated to map the Bloom-filtered-encoded output vector 116 from its M-dimensional space to the output vector 112 in a N-dimensional space. As another example, an element a of the output vector 112 may be calculated from the Bloom-filter-encoded output vector 116 using equation [4] below:

$$P_a = \Pi_{j=1}^{k} \hat{y} H_i(a), \quad [4]$$

wherein $P_a$ denotes an element a of the output vector P, $\hat{y}$ denotes the Bloom-filter-encoded output vector 116, and $H_i$ denotes the ith hash function. In some embodiments, the output vector 112 can be determined using the Bloom-filter-encoded output vector 116 and the Bloom filter matrix in equation [3] based on equation [5] below:

$$\log(P) = B^T \log(\hat{y}), \quad [5]$$

where P denotes the output vector 112, B denotes the Bloom filter matrix, and $\hat{y}$ denotes the Bloom-filtered-encoded output vector 116.

A computing system, such as the computing system 700 shown in FIG. 7 and described in greater detail below or some other computing system, may deploy a NN 102 with Bloom-filter-encoded input and output for use in a production computing environment. As shown, the dimensionality of the Bloom-filter-encoded input vector 114 is smaller than the dimensionality of the input vector 110, and the dimensionality of the Bloom-filter-encoded output vector 112 is smaller than the dimensionality of the Bloom-filter-encoded output vector 116. Thus, the size of the NN 102 is not only smaller than a neural network with the input vector 110 and output vector 112 as its input and output, but the NN 102 may also provide an improvement in performance due to the smaller number of computations that are performed.

Example Machine Learning Model

Figure 2:
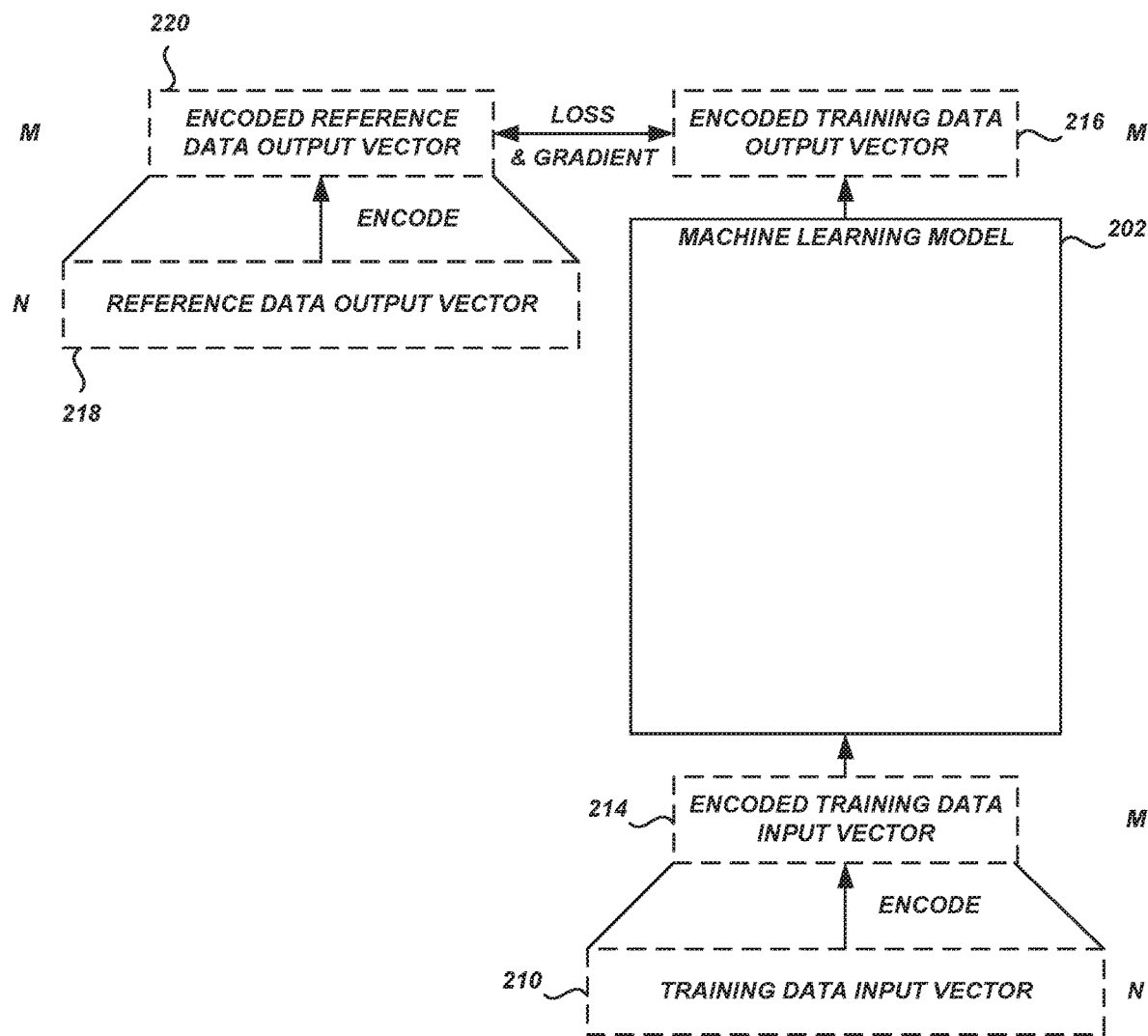
FIG. 2 is a schematic illustration of training a machine learning model with encoded training data according to some embodiments.

FIG. 2 is a schematic illustration of training a machine learning model with encoded training data. In some embodiments, training data for training a machine learning model 202 may include training data input vectors 210 and reference data output vectors 218. The machine learning model may be any model, including but not limited to a model implemented in Torch, TensorFlow, MXNet, Keras, Theano, Caffe, CNTK, DSSTNE, Paddle, or BigDL. For example, the machine learning model 202 may be a classification machine learning model or a non-classification machine learning model. As another example, the machine learning model 202 may comprise a linear regression model, a logistic regression model, a decision tree, a support vector machine, a Naïve or a non-Naïve Bayes network, a k-nearest neighbors (KNN) model, a k-means model, clustering model, a random forest model, or any combination thereof. A regression model or a support vector machine may learn the separations of encoded training data input vectors 214. A Bayes network may learn classifiers from encoded training data input vectors 214. A KNN model, a k-means model, or a cluster model may determine the nearest neighbors, the means, or encoded vectors in clusters in an encoded space. A decision tree or a random forest may learn a single or multiple decision trees, respectfully, to classify the encoded training data input vectors 214. As another example, the machine learning model 202 may comprise a convolutional neural network (CNN), a deep neural network (DNN), a recurrent neural network (RNN), or a wide and deep neural network, or a combination thereof. For a CNN, the input may be encoded from a 100×100 dimensional space to 50×50 dimensional space prior to being convolved. For a DNN, the input and the output may be encoded and decoded, respectively, as described herein. The number of internal layers may be large, such as 50. For a RNN, the input may be encoded and the output may be decoded as described herein. In addition, the input to a layer may include the output of the same layer. For example, the input to the input layer can include both the encoded input vector 214 and the output of the input layer weighed differently. For a wide and deep neural network, the encoded input vector 214 may be applied to one or both of the deep part of the NN and the wide part of the NN.

The training data input vectors 210 and the reference data output vectors 218 may each include N separate data elements or "dimensions" (where N is some positive integer). Instead of training the machine learning model 202 in the N-dimensional space of the training data input vectors 210 and the reference data output vectors 218, the machine learning model 202 may be trained using encoded training data input vectors 214 and encoded reference data output vectors 220. The encoded training data input vectors 214 and the encoded reference data output vectors 220 may each include M separate data elements or "dimensions" (where M is some positive integer smaller than 1V).

In some embodiments, the training data input vectors 210 and the reference data output vectors 218 may be encoded using a probabilistic data structure with a plurality of k mapping functions. For example, the training data input vectors 210 and the reference data output vectors may be encoded into encoded training data input vectors 214 and encoded reference data output vectors 220 using a Bloom filter or count-min sketch. Encoding using a Bloom filter is described herein with reference to FIG. 1. Briefly, a training data input vector 210 may be encoded into an encoded training data input vector 214 that is M dimensional using a plurality of k hash functions, such as the hash functions shown in equation [2] above. For example, if M equals 1,000 and a Bloom filter includes seven hash functions, then at most seven elements of the 1,000 elements of the encoded input vector each has a value of one and the remaining elements of the encoded input vector each has a value of zero. The position of each of the at most seven elements may be determined using one of the seven hash functions. The process may be repeated (e.g., synchronously, asynchronously, in parallel, or as part of a single matrix multiple computation) for each dimension or value of the training data input vector 210 to encode the training data input vector 210 into the encoded training data input vector 214.

In some embodiments, another probabilistic data structure may be used in addition to, or instead of, a Bloom filter. For example, a count-min sketch is a probabilistic data structure that may be used to encode training data input vectors 210 and reference data output vectors 218. Instead of elements of an encoded vector being 0 or 1, elements of an encoded training data input vector 214 or encoded reference data output vector 220 may be non-negative integers. For example, an encoded training data input vector 214 may include M non-negative integer elements. A count-min sketch may be implemented using a plurality of k hash functions, such as the plurality of hash functions shown in equation [2] above. As another example, if M equals 1,000 and a count-min sketch includes seven hash functions, then at most seven elements of the 1,000 elements of the encoded input vector each has an integer value greater than or equal to one and the remaining elements of the encoded input vector each has a value of zero. In some embodiments, elements of an encoded training data input vector 214 or encoded reference data output vector 220 may be analog values. For example, the analog values may be in the [0, 1] range.

In some embodiments, after encoding the training data input vectors 210 and reference data output vectors 218 into encoded training data input vectors 214 and encoded reference data output vectors 220 respectively, the parameters of the machine learning model 202 may be set in a process referred to as training. For example, the machine learning model 202 may generate an encoded training data output vector 216 from the encoded training data input vector 214. In some implementations, sets of individual encoded training data input vectors 214 ("mini-batches") may be processed at the same time by using an encoded input matrix instead of a single encoded input vector, which may speed up training. The machine learning model 202 may repeatedly process the encoded training data input vectors 214, and the parameters (e.g., the weight matrices) of the machine learning model 202 may be modified. For example, the parameters of the machine learning model 202 may be modified until the model 202 produces (or "converges" on) the correct or preferred output as determined using a loss function. A loss function may be a cross-entropy loss function shown in equation [6] below:

$$L(y,\hat{y}) = y \log(1-\hat{y}) + (1-y)\log(\hat{y}), \quad [6]$$

where y denotes the encoded reference data output vector 220 and $\hat{y}$ denotes the Bloom-filtered-encoded training data output vector 216. In some embodiments, the loss function may be a L2 Euclidean loss function, a logistic loss function, a hinge loss function, a square loss function, a softmax loss function, a logistic regression loss function, or a combination thereof.

The modification of weight values may be performed through a process referred to as "back propagation." Back propagation includes determining the difference between the expected model output (e.g., the encoded reference data output vectors 220) and the obtained model output (e.g., encoded training data output vectors 216), and then determining how to modify the values of some or all parameters of the model 202 to reduce the difference between the expected model output and the obtained model output.

In some embodiments, computing system, such as the computing system 700 shown in FIG. 7 and described in greater detail below or some other computing system, may execute a machine learning model training process, such as the process 300 shown in FIG. 3 and described in greater detail below. With encoding, such as Bloom filter encoding, training and optimization of the machine learning model 202 occurs in a space with a reduced dimensionality (e.g., a Bloom filter encoding space). Thus, weight values of the machine learning model 202 may fit into the memory of a processing unit, such as a graphical processing unit. In one implementation, encoding can be performed entirely as a data pre-processing step. Thus, the machine learning model 202 may be trained using existing training methods, such as gradient descent, and existing software capable of learning a machine learning model 202 from multi-label training data input vectors 210 and reference data output vectors 218. Also, since the loss and gradient computations happen in the reduced dimensionality space, the computational needs are also dramatically reduced. In some embodiments, the encoded training data input vector 214 and the encoded reference output vector 220 are significantly less sparse (e.g., as measured by a ratio of the number of dimensions having non-zero values with respect to the number of dimensions overall) than vectors that are not encoded. For example, if the sparsity of a vector (e.g., the training data input vector 210) is p/N, the sparsity of an encoded vector (e.g., the encoded training data input vector 214) is kp/M, where N>>M. Reduced sparsity may result in easier training, contributing to an improved performance of the resulting machine learning model 202. Also, reducing the number of weights in the model 202 may have a regularizing effect.

Example Neural Network with Sparse Input and Dense Encoded Output

Figure 3:
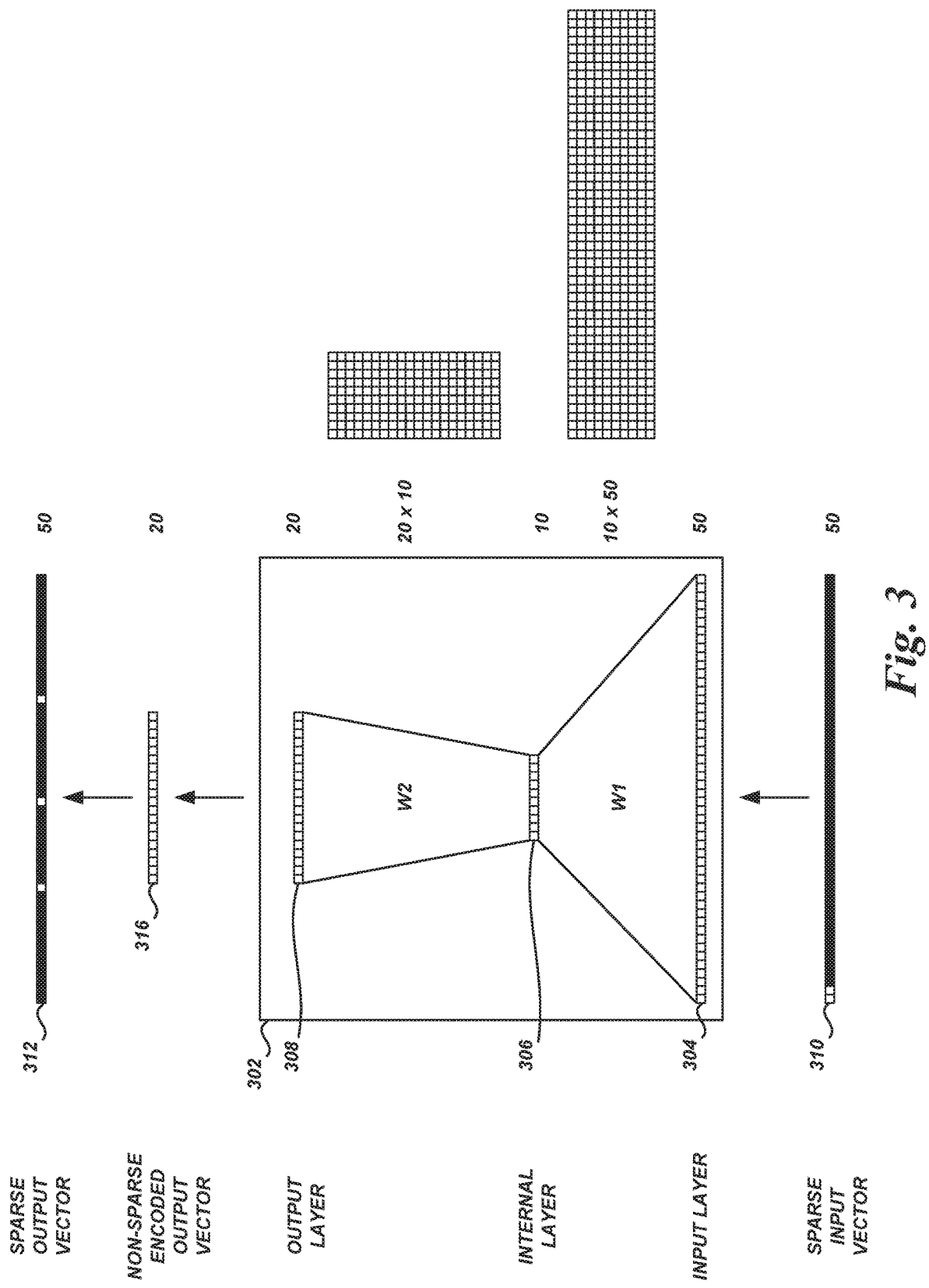
FIG. 3 is an illustrative example process of using a neural network with sparse input and dense encoded output according to some embodiments.

FIG. 3 illustrates an example of using a neural network with sparse input and dense encoded output. As shown, the NN 302 has an input layer 304 with 50 nodes, one internal layer 306 with 10 nodes, and an output layer 108 with 20 nodes. The specific number of layers shown in FIG. 3 is illustrative only, and is not intended to be limiting. In some NNs, different numbers of internal layers and/or different numbers of nodes in the input, internal, and/or output layers may be used. In some implementations, each layer may have the same number or different numbers of nodes.

In the illustrated example, the input vector 310 includes 50 separate data elements or "dimensions." In some embodiments, the elements of the input vector 310 can include a purchase history of a user. For example, the elements of the input vector 310 can be 0 (shown as block boxes) or 1 (shown as white boxes), where 0 represents the user not having purchased an item during a time period and 1 represents the user having purchased the item during the time period. Such an input vector 310 may be quite sparse. As illustrated in FIG. 3, the input vector 310 and the output vector 312 may have a substantial majority of "0" values, such as 96% "0" values (e.g., 48 out of 50 data elements have "0" values, shown as black boxes). For example, a user may have purchased two items out of 50 available items for purchase. As another example, the user may have watched two videos out of 50 available videos.

In some embodiments, the output vector 312 may be determined by decoding a Bloom-filter-encoded output vector 316 that is non-sparse or "dense." Each data element of the non-sparse encoded output vector 312 may be a value, such as a floating-point number or integer. In some embodiments, the elements of the output vector 312 can correspond to a probability of the user purchasing items during a subsequent time period. For example, the elements of the output vector 312 can be 0 or any positive number, representing or otherwise associated with the predicted probability of the user purchasing an item during the subsequent time period. In some embodiments, elements of the output vector 312 may have analog values in the [0, 1] range. As illustrated in FIG. 3, the output vector 312 may be sparse. For example, the majority of the elements of the output vector 312 may have "0" values or values close to zero (e.g., 94% or 47 out of 50 data elements have "0" values, shown as black boxes). The remaining of the elements of the output vector 312 may be non-zero values or values not close to zero (shown as white boxes). If the value is greater than some predetermined or dynamically determined threshold, a computing system using the output of the NN 302 can predict that the user will purchase the item during the subsequent time period. In some embodiments, the items associated with the top n values (where n is some positive integer, ratio, or percentage, such as top 3 items or top 6% of the items) can be selected, based on an ordering of the items by their respective output values.

The specific numbers of elements of the input vector 310 and output vector 312 with "0" values shown in FIG. 3 are illustrative only, and are not intended to be limiting. In some NNs, different numbers or percentage of the elements of the input vector 310 and the output vector 312 may have "0" values (e.g., 999,990 out of 1,000,000 data elements, or 99% of the data elements).

Input to a NN, such as the NN 302 shown in FIG. 3, occurs at the input layer 304. In some embodiments, as shown, a single input to the NN 302 may take the form of the sparse input vector 310. The number of nodes in the input layer 304 and the dimensionality of the input vector 310 may be the same, such as 50. The connections between individual nodes of adjacent layers (e.g., between the input layer 304 and the internal layer 306, or between the internal layer 306 and the output layer 308) are each associated with a trainable parameter, or weight, that is applied to the value passed from the prior layer node to the activation function of the subsequent layer node. The weights associated with the connections from the input layer 304 to the internal layer 306 it is connected to may be arranged in a weight matrix W1 with a dimension of 10×50. The individual rows in the weight matrix W1 may correspond to the individual nodes in the input layer 304, and the individual columns in the weight matrix W1 may correspond to the individual nodes in the internal layer 306. The weight associated with a connection from any node in the input layer 304 to any node in the internal layer 306 may be located at the corresponding intersection location in the weight matrix. The weights associated with the connections from the internal layer 306 to the output layer 308 may be arranged in a weight matrix W2, similar to the weight matrix W1. The weight matrix W2 has a dimension of 20×10. The model size of the NN 302, in terms of the number of weights, may be 700. In contrast, the model size of a NN with the input vector 310 and the output vector 312 as its input and output may be 1000.

In one embodiment, the input vector 310 would be provided to a computer processor that stores or otherwise has access to the weight matrix W1. The processor would then multiply the sparse input vector 310 by the weight matrix W1 to produce an intermediary vector that is ten-dimensional, the dimensionality of the internal layer 306. The processor may adjust individual values in the intermediary vector using an offset or bias that is associated with the internal layer 306 (e.g., by adding or subtracting a value separate from the weight that is applied). In addition, the processor may apply an activation function to the individual values in the intermediary vector (e.g., by using the individual values as input to a sigmoid function or a rectified linear unit (ReLU) function) to generate the non-sparse, Bloom-filter encoded output vector 316 (or another non-sparse encoded output vector). For illustration, the dimensionality of the he non-sparse, Bloom-filter encoded output vector 316 is 20 in FIG. 3. In some embodiments, the dimensionality of the non-sparse Bloom-filter-encoded output vector 316 may be larger, such as 100, or 1,000. The processor may multiply the intermediary vector by the weight matrix W2 to generate the Bloom-filter-encoded output vector 316. The processor may adjust individual values of the multiplication result using an offset or bias that is associated with the output layer 308 to generate the Bloom-filter-encoded output vector 316. In addition, the processor may apply an activation function to the individual values of the multiplication result to generate the Bloom-filter-encoded output vector 316. Illustratively, elements of the Bloom-filter-encoded output vector 316 may be analog numbers in the range [0, 1].

In some embodiments, to decode the Bloom-filter-encoded output vector 316 and generate the output vector 312, the Bloom-filter-encoded output vector 316 may be mapped from its 20-dimensional value space to the output vector 312 in a 50-dimensional value space. For example, to decode the Bloom-filter-encoded output vector 316, the k hash functions of a Bloom filter may be evaluated to map the Bloom-filtered-encoded output vector 316 from its 20-dimensional space to the output vector 312 in a 50-dimensional space. As another example, an element a of the output vector 312 may be calculated from the Bloom-filter-encoded output vector 316 using equation [4] above. In some embodiments, the output vector 312 can be determined using the Bloom-filter-encoded output vector 316 and the Bloom filter matrix in equation [3] based on equation [5] above.

In some embodiments, a computing system, such as the computing system 700 shown in FIG. 7 and described in greater detail below or some other computing system, may deploy a NN 302 with non-encoded input and Bloom-filter-encoded output for use in a production computing environment. As shown, the dimensionality of the Bloom-filter-encoded output vector 312 is smaller than the dimensionality of the Bloom-filter-encoded output vector 316. Thus, the size of the NN 302 is not only smaller than a neural network with the output vector 312 as its output, but the NN 302 may also provide an improvement in performance due to the smaller number of computations that are performed.

Example Process for Training a Neural Network with Encoded Training Data

Figure 4:
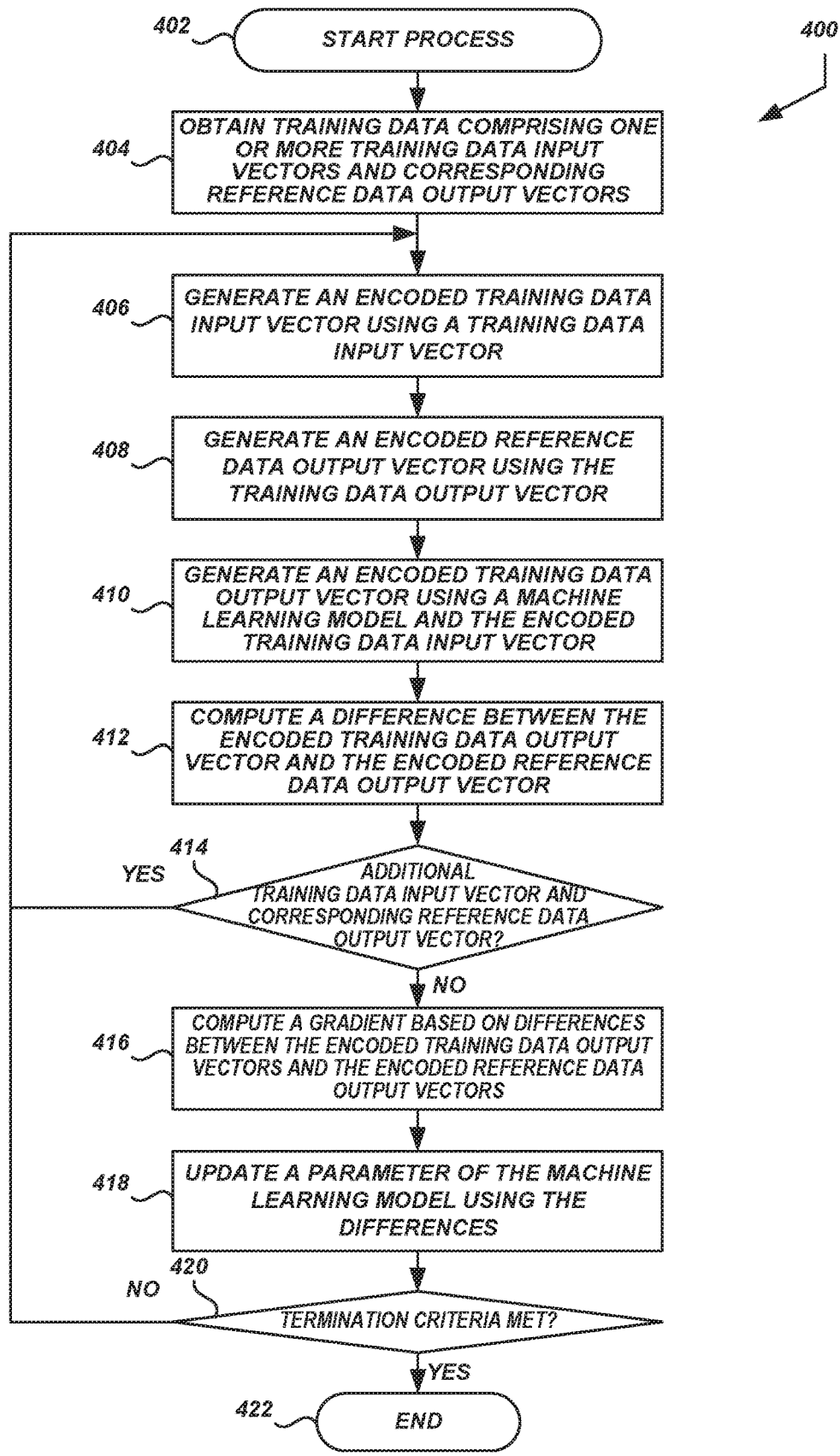
FIG. 4 is a flow diagram of an illustrative process for training a machine learning model with encoded training data according to some embodiments.

FIG. 4 is a flow diagram of a process used in some embodiments for training a machine learning model with encoded training data. Illustratively, if the training data includes the purchase histories of 100,000 items for one or more users, most elements of the training data input vectors and reference data output vectors may have zero values because individual users may each purchase only a small fraction of all the items available for purchase. This may be referred to as "sparse" data. Advantageously, by encoding training data input vectors and reference data output vectors into encoded training data input vectors and encoded reference data output vectors, the sparsity of the vectors used in training a machine learning model decreases. Consequently, the output of the machine learning model may be more accurate. In some embodiments, encoding may be implemented directly on a GPU, resulting in several benefits. For example, scalability at inference time may be increased because the encoding matrix (e.g., the Bloom filter encoding matrix B shown in equation [3] above) would never need to be instantiated. Furthermore, training on datasets with many rows would become faster, because only the sparse representation of the input and output data would need to move over a slow bus from CPU to GPU. For sufficiently small datasets, the entire data set may be loaded into GPU memory, so the speed of the bus is not an issue.

The process 400 may reduce the size or "dimensionality" of input data vectors by encoding the vectors, thus improve training data quality (e.g., by reducing the sparseness of the input data) and improving training performance of the machine learning model (e.g., by reaching convergence more quickly). In addition, by reducing the dimensionality of input data vectors, the model size of a machine learning model, for example the NN 100 shown in FIG. 1 and the machine learning model shown in FIG. 2, decreases, and performance of the trained model may improve.

The process 400 begins at block 402. The process 400 may be embodied in a set of executable program instructions stored on a computer-readable medium, such as one or more disk drives, of a computing system, such as the computing system 700 shown in FIG. 7 and described in greater detail below. When the process 400 is initiated, the executable program instructions can be loaded into memory, such as RAM, and executed by one or more processors of the computing system 700. Although the process 400 is described with respect to the computing system 700 shown in FIG. 7, the description is illustrative only and is not intended to be limiting. In some embodiments, the process 400 or portions thereof may be performed serially or in parallel by multiple computing systems.

At block 404, the computing system 700 can in some embodiments obtain training data for use in training a machine learning model, such as the NN 102 shown in FIG. 1 or the machine learning model 202 shown in FIG. 2. For example, the training data may include input vectors that include feature data for a recommendation process to be performed (e.g., item recommendation generation) or a recognition process to be performed (e.g., automatic speech recognition, facial recognition, handwriting recognition, etc.). Each training data input vector may be associated with a reference data output vector, which is a correct or otherwise expected output.

In some embodiments, training data input vectors and reference data output vectors may include time-based information. Instead of each element of the training data input vectors and reference data output vectors being 0 or 1, these vectors may have analog values in the range of [0, 1] to represent time. For example, time decay may be represented as shown in equation [7] below:

$$x_a = \left(1 + \frac{d_a}{\tau}\right)^{-1}, \quad [7]$$

where $x_a$ denotes a ath element of the input vector x, $d_a$ denotes the number of days since an item was purchased or consumed, relative to a configurable cutoff, which may be the end of the training period, and $\tau$ denotes a tunable hyper-parameter.

In some embodiments, the training data may be sparse. For example, elements of the training data input vectors can be 0 or 1, where 0 represents the user not having purchased an item during a time period and 1 represents the user having purchased the item during the time period. The average number of elements of the input training data vectors with values of 1 may be 69. Illustratively, this average corresponds to an average 10 items being purchased per user, multiplied by seven values being set per item (one for each of the k=7 hash functions), with one collision (the same value is set for two different items due to a hash collision). As another example, elements of the output reference data vectors can be 0 or 1, where 0 represents the user not having purchased an item during a subsequent time period and 1 represents the user having purchased the item during the subsequent time period. There may be an average of only 2 elements of the output reference data vectors with values of 1, indicating that the user is predicted to purchase only 2 out of the 100,000 available items, or that the user is to be recommended only 2 out of the 100,000 available items.

At block 406, the computing system 700 can in some embodiments generate an encoded training data input vector using the training data input vector and a probabilistic data structure. For example, the probabilistic data structure may be a Bloom filter or count-min sketch. A training data input vector that is N dimensional may be encoded into an encoded training data input vector that is M dimensional using a k hash functions of the probabilistic data structure, where k is a positive integer, and where M is smaller than N.

Non-limiting examples of the mapping functions includes a string-based hash function (such as MD5), a non-cryptographic hash function (such as a MurmurHash), or any combination thereof. The computing system 700, using a Bloom filter, may generate an encoded training data input vector with each element being 0 or 1. For example, if M equals 1,000 and a Bloom filter includes seven hash functions, then at most seven elements of the 1,000 elements of the encoded input vector have a value of one and the remaining elements of the encoded input vector each has a value of zero. The position of each of the at most seven elements may be determined using one of the seven hash functions. With a count-min sketch, the computing system 700 may generate an encoded training input vector with each element being a non-negative integer. For example, if M equals 1,000 and a count-min sketch includes seven hash functions, then at most seven elements of the 1,000 elements of the encoded input vector have an integer value greater than or equal to one and the remaining elements of the encoded input vector each has a value of zero.

At block 408, the computing system 700 can in some embodiments generate an encoded reference data output vector using the reference data output vector and the probabilistic data structure. For example, a reference data output vector that is N dimensional may be encoded into an encoded reference data output vector that is M dimensional using the plurality of k hash functions of the probabilistic data structure, where M is smaller than N. Out of the M elements of the encoded reference data output vector, at most k elements have values other than zero (one if the probabilistic data structure is a Bloom filter and a positive integer if the probabilistic data structure is a count-min sketch).

At block 410, the computing system 700 can in some embodiments generate an encoded training data output vector using a machine learning model and the encoded training data input vector. For example, the machine learning model may generate an encoded training data output vector with each element being an analog value in the range of [0, 1] from a training data input vector with each element being 0 or 1. In some implementations, the dimensionality of the encoded training data output vector and the dimensionality of the encoded training data output vector can be the same.

In some embodiments, sets of encoded training data input vectors (e.g., "mini batches") may be arranged as encoded input matrices. Each row of an input matrix may correspond to an individual encoded training data input vector, and each column of the input matrix may correspond to an individual node of the input layer 104 of the NN 102. The data element in any given input vector for any given node of the internal layer 104 may be located at the corresponding intersection location in the weight matrix W1. For example, the training data can represent on-demand video purchase and view histories. There can be 100,000 videos available for purchase or view. Thus, the dimensionality of the training data input vectors and reference data output vectors can be 100,000. And the dimensionality of the encoded training data input vectors, the encoded reference data output vectors, the input layer, and/or the output layer of the NN 102 can be 1,000.

In some embodiments, the dimensionality of the encoded training data input vector, the encoded reference data output vector, and training data output vector may be based solely or primarily on the amount of memory available to store the machine learning model during training and/or use. In one embodiment, the process 400 may include first determining the maximum dimensionality of the encoded vectors for a target processor (CPU, GPU, etc.).

At block 412, the computing system 700 can in some embodiments compute a difference between the encoded training data output vector generated at block 410 and the encoded reference data output vector generated at block 408. The encoded reference data output vector can be used during the training process to determine how accurate the machine learning model is in processing the corresponding encoded reference data output vector. Each training data input vector may be associated with a single correct or expected classification, e.g., the corresponding reference data output vector. Similarly, each encoded training data input vector may be associated with a single correct or expected output, e.g., the corresponding encoded reference data output vector The goal of training may to minimize the difference between an encoded training data output vector and the encoded reference data output vector. In some embodiments, the computing system 700 may compute the difference using a loss function, such as a cross-entropy loss function shown in equation [6], a L2 Euclidean loss function, a logistic loss function, a hinge loss function, a square loss function, or a combination thereof.

At decision block 414, the computing system 700 can in some embodiments determine whether the training data comprises additional training data input vectors and corresponding reference data output vectors for the current iteration of training the machine learning model. If so, the process 400 may return to block 406; otherwise, the process 400 may proceed to block 416. For example, the training data may include additional training data input vectors and corresponding reference data output vectors. If the additional training data input vectors and corresponding reference data output vectors are for the current iteration of training the machine learning model, the process 400 may return to block 406; otherwise, the process 400 may proceed to block 416.

At block 416, the computing system 700 can in some embodiments compute a gradient based on differences between the encoded training data output vectors and the encoded reference data output vectors. For example, a derivative, or "gradient," can be computed that corresponds to the direction in which each parameter of the machine learning model is to be adjusted in order to improve the model output (e.g., to produce output that is closer to the correct or preferred output for a given input). In some embodiments, the computing system 700 can compute the gradient for a subset of the training data, rather than the entire set of training data. Therefore, the gradient may be referred to as a "partial gradient" because it is not based on the entire corpus of training data. Instead, it is based on the differences between the encoded training data output vectors and the encoded reference data output vectors when processing only a particular subset of the training data.

At block 418, the computing system 700 can in some embodiments update a parameter of the machine learning model based on the gradient computed at block 416. For example, the computing system 700 can update some or all parameters of the machine learning model using a gradient descent method. In one embodiment, parameters of the machine learning model (e.g., the weights of the model) are updated using back propagation. In back propagation, a training error is determined using a loss function at block 412, and the training error may be used to update the individual parameters of the machine learning model at block 418 in order to reduce the training error. A gradient may then be computed for the loss function at block 416 to determine how the weights in the weight matrices are to be adjusted at block 418 to reduce the error. The adjustments may be propagated back through the NN 102 layer-by-layer. Some example processes for training a NN are described in commonly-owned U.S. patent Ser. No. 14/087,852 titled "DISTRIBUTED TRAINING OF MODELS USING STOCHASTIC GRADIENT DESCENT" and filed on Nov. 22, 2013, the disclosure of which is incorporated by reference herein in its entirety. At decision block 420, the computing system 700 can in some embodiments determine whether termination criteria are met. For example, the termination criteria can be based on the accuracy of the machine learning model as determined using the loss function. If so, the process 400 can terminate at block 422; otherwise, the process 400 can return to block 406.

In one experimental implementation, the impact of encoding on the performance of a NN was observed. NNs were trained using 100,000 training data input vectors and corresponding reference data output vectors and validated using 15,000 input vectors and corresponding output vectors. These samples were generated by randomly sampling 1.5 million records, each representing the movies a user watched from 2013-2014, without replacement. The evaluation criterion for these results was precision@6 or p@6, calculated by ranking all the movies in the vocabulary according to their predicted score, and counting how many of the top 6 recommended movies match a movie that the user actually watched in the evaluation time period. The precision@6 was 5.7%, as compared to a baseline precision@6 of 4.8%.

Example Process for Using a Neural Network Trained with Encoded Training Data

Figure 5:
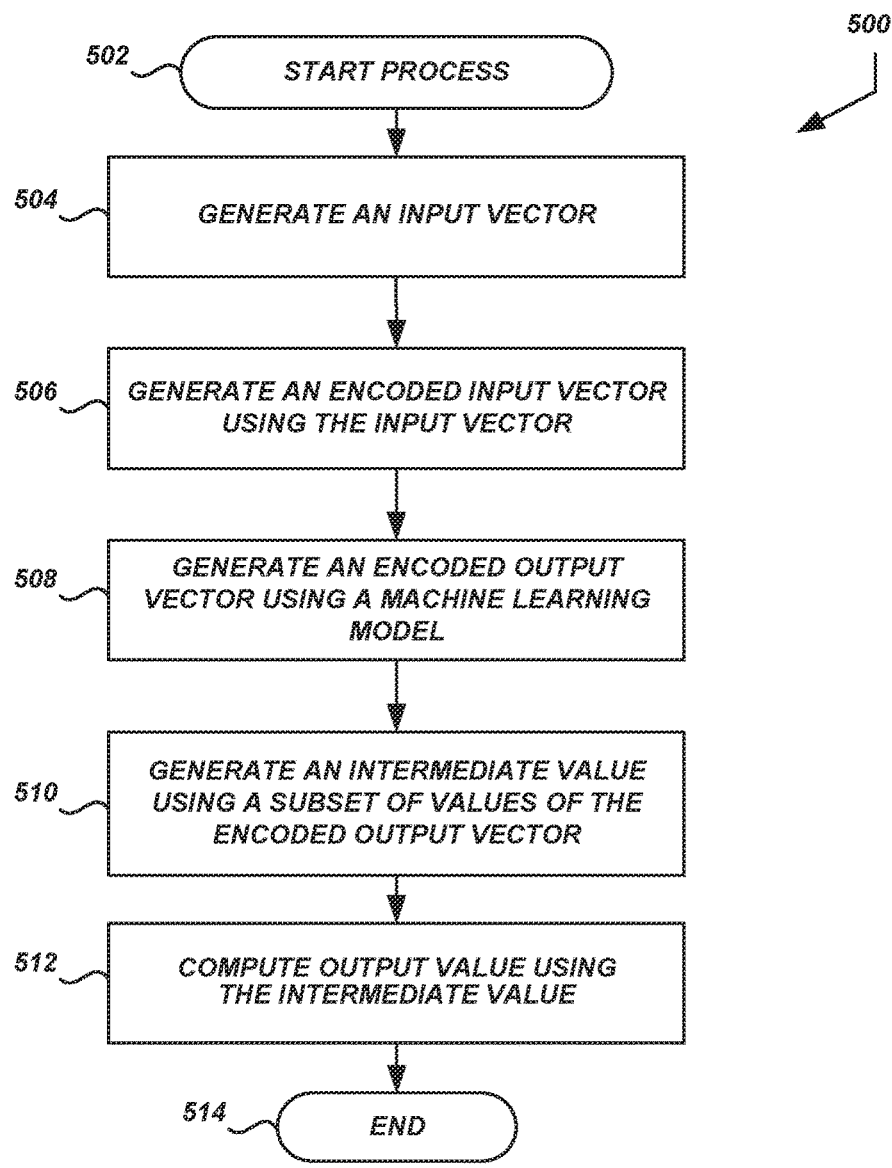
FIG. 5 is a flow diagram of an illustrative process for using a machine learning model trained with encoded training data according to some embodiments.

FIG. 5 is a flow diagram of an example process for using a machine learning model trained with encoded training data according to some embodiments. The process 500 begins at block 502. In some embodiments, the illustrative process 500 may be implemented following implementation of process 400, discussed above, such that block 502 occurs subsequent to block 422 described above. The process 500 may be embodied in a set of executable program instructions stored on a computer-readable medium, such as one or more disk drives, of a computing system, such as the computing system 700 shown in FIG. 7 and described in greater detail below. When the process 500 is initiated, the executable program instructions can be loaded into memory, such as RAM, and executed by one or more processors of the computing system 700. Although the process 500 is described with respect to the computing system 700 shown in FIG. 7, the description is illustrative only and is not intended to be limiting. In some embodiments, the process 500 or portions thereof may be performed serially or in parallel by multiple computing systems.

At block 504, the computing system 700 can in some embodiments obtain an input vector (e.g., an input tensor). For example, the input vector may represent the purchase history of a user during a time period. In some embodiments, the elements of the input vector can be 0 or 1, where 0 indicates that the user has not purchased an item during the time period and 1 indicates that the user has purchased the item during the time period. In one example, the dimensionality of the input vector is 100,000, corresponding to 100,000 different items.

At block 506, the computing system 700 can in some embodiments generate an encoded input vector using the input vector and a probabilistic data structure. For example, the probabilistic data structure may be a Bloom filter or count-min sketch. An input vector that is N dimensional may be encoded into an encoded input vector that is M dimensional using a plurality of k hash functions of the probabilistic data structure, where M is smaller than N. Elements of the encoded input vector may be binary, non-negative integers, or real numbers in the [0, 1] range. The encoded input vector comprises a compressed representation of the input vector having fewer values than the input vector. In some embodiments, the vector obtained in block 504 may not be encoded, but may be processed in some other manner or input directly into the neural network without any encoding or other processing.

At block 508, the computing system 700 can in some embodiments generate an encoded output vector using a machine learning model (e.g., the machine learning model learned using the process 300) and the encoded input vector (or, in some embodiments, a non-encoded vector). For example, the machine learning model may generate an encoded output vector with each element being an analog value in the range of [0, 1] from an encoded input vector with each element being binary, a non-negative integer, or an analog value in the range of [0, 1]. The encoded output vector comprises a compressed representation of an output vector having fewer values than the output vector. For example, as described herein, the encoded output vector may be a Bloom-filter-encoded representation of a sparse, high-dimensional vector. However, in some embodiments, the Bloom-filter-encoded representation may include analog values rather than binary values.

At block 510, the computing system 700 can in some embodiments generate an intermediate value using a product of a subset of values of the encoded output vector. The subset of values may be the values corresponding to dimensions of the encoded output vector specified by the k mapping functions of a probabilistic data structure. For example, k hash functions may be used to identify k different values of the encoded output vector to be used in generating an intermediate value for a particular dimension of a non-encoded output vector (e.g., the output vector for which the encoded output vector is a compressed representation). The subset, comprising the k different values of the encoded input vector, may then be used to compute the intermediate value. Illustratively, the intermediate value may be a product of the subset of values, a sum of the subset of values, a maximum of the subset of values, a bitwise Boolean operation of the subset of values, or some other function output computed using the subset of values. In some embodiments, an element a of the output vector may be calculated from the encoded output vector using equation [4] above. Because in equation [4] only one element of $H_i(a)$ is non-zero, $\hat{y}$ $H_i(a)$ equals the product of the non-zero element of $H_i(a)$ multiplied by the corresponding element in $\hat{y}$. Accordingly, the intermediate value $\hat{y}$ $H_i(a)$ may be calculated from one value of the encoded output vector $\hat{y}$. In some embodiments, the process may be repeated to determine a separate intermediate value for each dimension of the non-encoded output vector, or for some subset thereof.

At block 512, the computing system 700 can in some embodiments compute an output value using the intermediate value determined above. For example, the computing system 500 can compute a score representing a probability of purchase for an item. The score representing the probability may be a summation of $\hat{y}$ $H_i(a)$, including the intermediate value, shown in equation [4] above. In some embodiments, different $\hat{y}$ $H_i(a)$ may be weighed differently in the summation. Overall, only a subset of values of the encoded output vector is used in or otherwise affects computing the summation in equation [4]. In some implementations, the computing system 700 can generate a binary value for an item. For example, if the score representing the probability of purchase for an item is above a threshold, such as 0.5, the binary value may be 1 and 0 otherwise. As another example, the binary value may be 1 for the n items with the highest scores, where n is a number of items, or a percentage or ratio of all items. As another example, if the score representing the probability of purchase for an item is above a threshold that is determined stochastically (e.g., using a pseudo-random algorithm) for the score, the binary value may be 1, otherwise it may be 0. By determining the threshold stochastically for each score (or for a group of scores), the binary value is more likely to be 1 if the score is higher. However, the binary value may be 0 even though the score is high. Such stochastic determination of the threshold can increase the diversity of recommendation, which may in turn help with collecting better data for future training of the machine learning model. The process 500 can terminate at block 514.

Operating Environment

Figure 6:
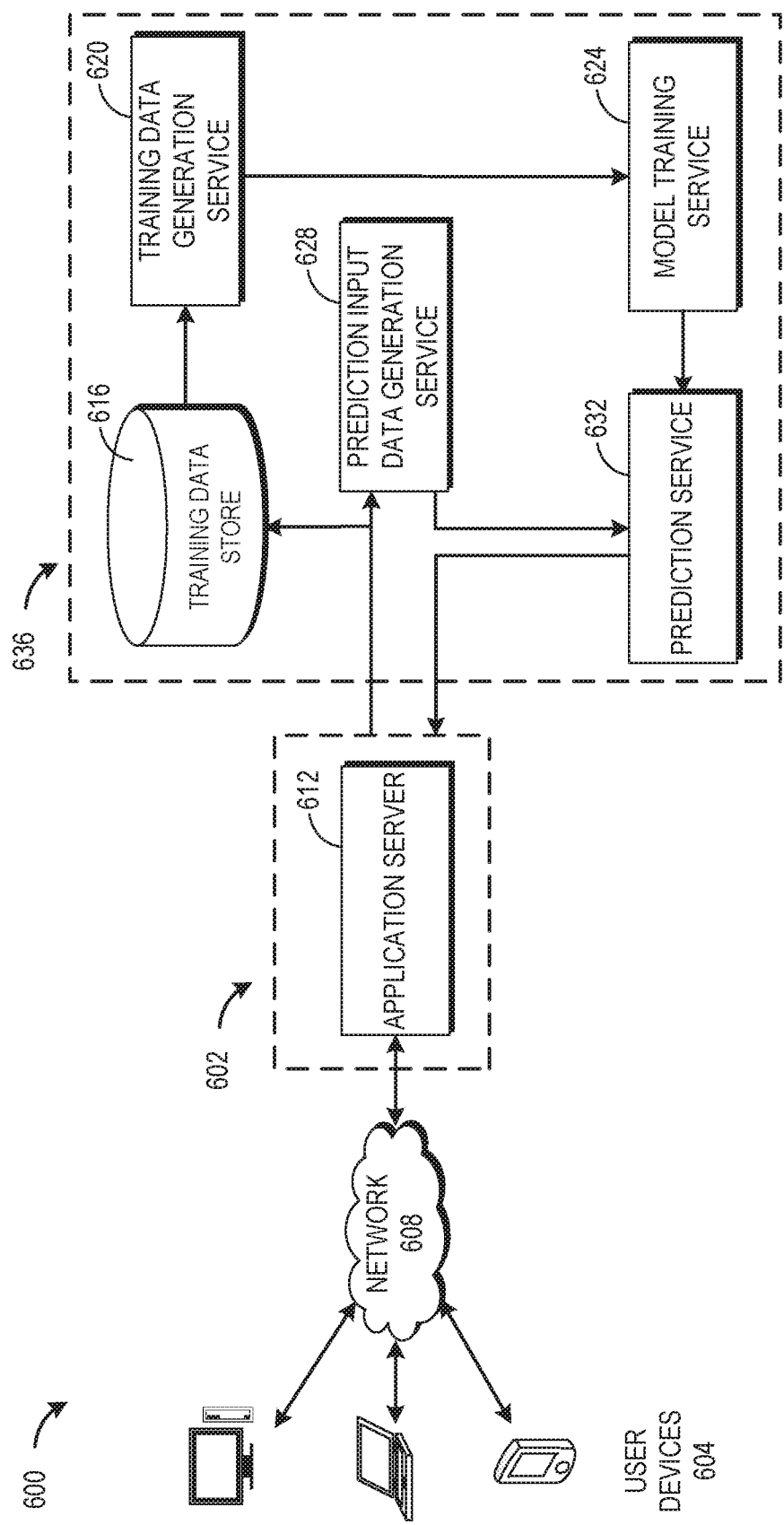
FIG. 6 is a block diagram depicting an illustrative operating environment for training a machine learning model in an encoded, reduced-dimensional space and generating predictions using the trained machine learning model according to some embodiments.

FIG. 6 is a block diagram depicting an illustrative operating environment 600 used in some embodiments for learning an outcome prediction model and generating predictions using the learned outcome prediction model. The illustrative operating environment 600 shown in FIG. 6 includes an electronic commerce system that enables users to browse items (such as items listed in an electronic catalog for purchase) using user devices 604 through a communication network 608. The electronic commerce system 604 may also provide users with recommendations. In some embodiments, the computing system 602 may provide content streaming services to users. As will be appreciated, a retail service and/or a streaming service are simply provided as examples. Aspects of the present disclosure are applicable to a large number of other environments where other types of predictions or other determinations may be made using a machine learning model.

In some embodiments, the electronic commerce system 602 may include an application server 612 (for example, a retail server, or a streaming server) that provides users with an electronic catalog of items for purchases. The application server 612 may facilitate electronic browsing and purchasing of items using various user devices, such as user computing devices 604 (which may alternatively be referred to herein as client computing devices), through the communication network 608. The application server 612 is generally responsible for providing front-end communication with various user devices, such as a user computing device 604, via the network 608. The front-end communication provided by the application server 612 may include generating text and/or graphics, possibly organized as a user interface using hypertext transfer or other protocols in response to information inquiries received from the various user devices 604.

User computing devices 604 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

In the environment 600 shown in FIG. 6, a user of the electronic commerce system 602 may utilize a user computing device 604 to communicate with the application server 612 (for example, a retail server) via the communication network 608, such as the Internet or other communications link. The network 608 may be any wired network, wireless network or combination thereof. In addition, the network 608 may be a personal area network, local area network, wide area network, cable network, satellite network, cellular telephone network, etc., or combination thereof. For example, the network 608 may be a publicly accessible network of linked networks, possibly operated by various distinct parties, such as the Internet. In some embodiments, the network 608 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 608 may use protocols and components for communicating via the Internet or any of the other aforementioned types of networks.

In some embodiments, the application server 612 may be connected with or in communication with a training data store 616, which may store training data. Training data may include account information, purchase history, browsing history, item reviews and ratings, personal information, location information, billing information, and/or other information, depending on the embodiment. The training data store 616 may include information regarding users' previous actions, such as previous purchases. The application server 612 may provide indications of user actions with respect to the application server 612 to the training data store 616.

In some embodiments, the training data store 616 may be local to the electronic commerce system 602, may be remote from the electronic commerce system 602, and/or may be a network-based service itself. The illustrated data store may be embodied in hard disk drives, solid state memories, any other type of non-transitory computer-readable storage medium, and/or a file, a database, a relational database, in-memory cache, and/or stored in any such non-transitory computer-readable medium accessible to the application server 612 and/or a training data generation service 620. The data store 616 may also be distributed or partitioned across multiple local and/or storage devices, or combined into a single storage device, without departing from the spirit and scope of the present disclosure.

The training data generation service 620 may be connected to or in communication with the training data store 616. The training data generation service 620 may send instructions to the training data store 616 that provide the training data store 616 with the criteria for creating the training data. In some embodiments, instead of providing the training data store 616 with the criteria for creating the training data, the training data generation service 620 may generate training data from the data received from the training data store 616. The training data generation service 620 may provide a model training service 624 with training data, which the model training service 624 may use to learn a machine learning model in an encoded, reduced-dimensional space (such as the neural network 102 or the machine learning model 202). For example, the model training service 624 may generate encoded training data in an encoded, reduced-dimensional space. The model training service 624 may provide the trained machine learning model to a prediction service 632.

In some embodiments, after observing a user action (such as item purchases, page views and/or other actions) of a user, the application server 612 may provide the observed user action with respect to the application server 612 to a prediction input data generation service 628. The prediction input data generation service 628 may process the observed user action into a format suitable for the prediction service 632 to determine, for the user, a recommendation. For example, the data generation service 628 may process the observed user action into an input vector. The prediction service 632 may determine, for the user, a recommendation based on the machine learning model received from the model training service 624 and processed observed user action received from the prediction input data generation service 628. For example, the prediction service 632 may, for the user, generate an encoded input vector, which the prediction service 632 uses in turn to generate an encoded output vector using the machine learning model. The prediction service 632 may then decode the encoded output vector into a predicted output vector, which the prediction service 632 can use to determine, for the user, a recommendation.

In some embodiments, training data generated by the training data generation service 620 and the data used in prediction processed by the prediction input data generation service 628 may be similarly formatted. For example, the training data and the processed observed user action may have the same level of granularity with respect to the products purchased or viewed, videos watched, music listened, or services subscribed to.

In some embodiments, as depicted in FIG. 6, a prediction computing system 636 may implement the training data store 616, the training data generation service 620, the model training service 624, the prediction input data generation service 628, and the prediction service 632. In some implementations, the data store 616 and the services may be components of one computing system. In other embodiments, the prediction computing system 636 may operate in a distributed computing environment including several computer systems that are interconnected using one or more computer networks. The prediction computing system 636 could also operate within a computing environment having a fewer or greater number of devices or services than are illustrated in FIG. 6. Thus, the depiction of prediction computing system 636 in FIG. 6 should be taken as illustrative and not limiting to the present disclosure. For example, the prediction computing system 636 could implement various Web services components and/or peer-to-peer network configurations to implement at least a portion of the processes described herein.

In some embodiments, the services provided by the prediction computing system 636 may be implemented as one or more web services consumable via the network 608. For example, after observing a plurality of user actions for a plurality of users (such as item purchases, page views and/or other actions), the application server 612 may provide the observed user actions with respect to the application server 612 to the prediction computing system 636 for training a machine learning model. The application server 612 can provide a plurality of observed user actions for the prediction service 632 to determine recommendations for users based on the machine learning model. The prediction computing system 636 can receive observed user actions for training the machine learning model and determining recommendations via web services. In further embodiments, the prediction computing system 636 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Execution Environment

Figure 7:
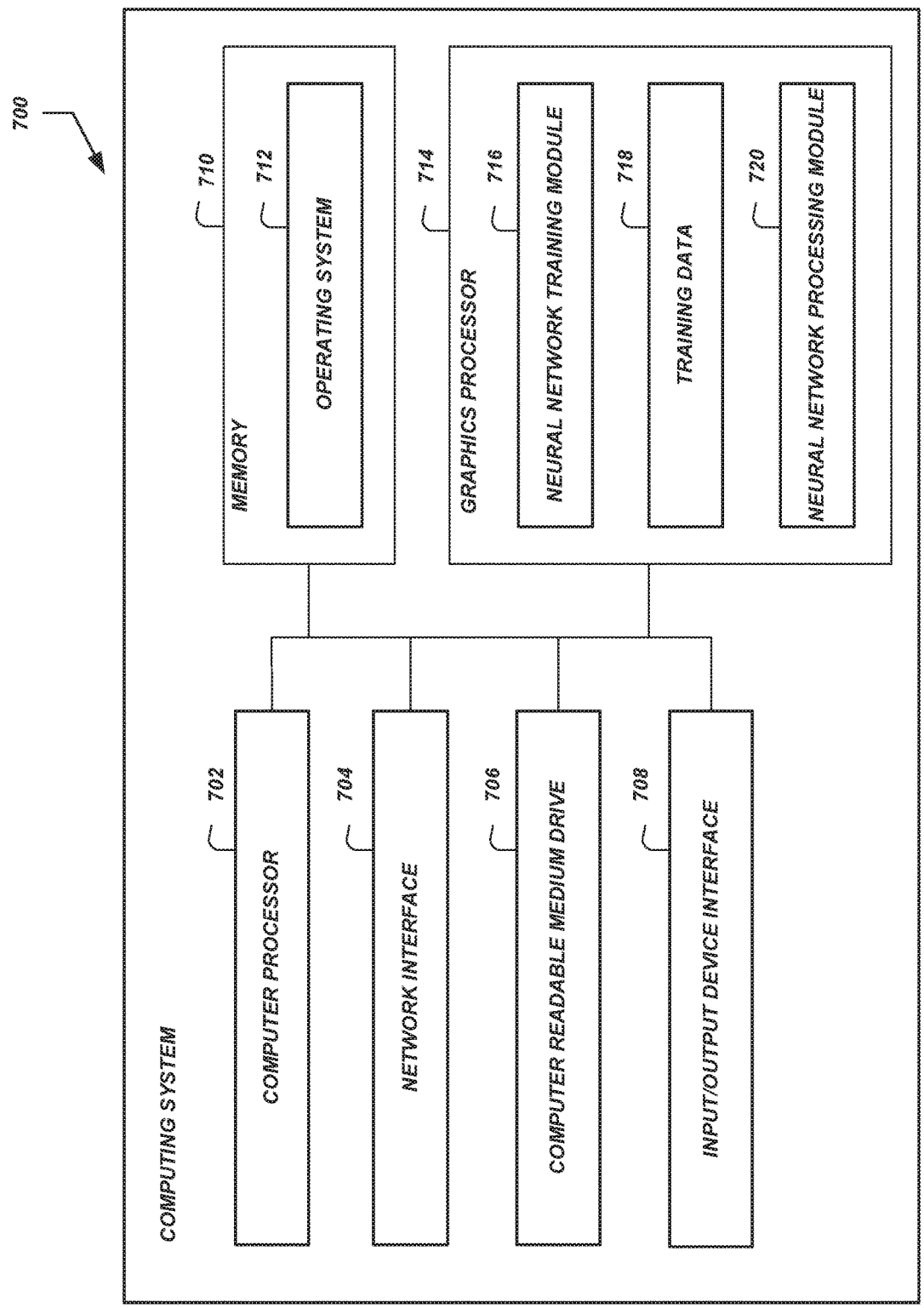
FIG. 7 is a block diagram of an illustrative computing system configured to implement training and processing of artificial neural networks according to some embodiments.

FIG. 7 illustrates an example computing system 700 that may be used in some embodiments to execute the processes and implement the features described above. In some embodiments, the computing system 700 may include: one or more computer processors 702, such as physical central processing units ("CPUs"); one or more network interfaces 704, such as a network interface cards ("NICs"); one or more computer readable medium drives 706, such as high density disks ("HDDs"), solid state drives ("SDDs"), flash drives, and/or other persistent non-transitory computer-readable media; an input/output device interface 708, such as an IO interface in communication with one or more microphones; one or more computer readable memories 710, such as random access memory ("RAM") and/or other volatile non-transitory computer-readable media; and one or more graphical processors 714, such as graphics processing units ("GPUs").

The network interface 704 can provide connectivity to one or more networks or computing systems. The computer processor 702 can receive information and instructions from other computing systems or services via the network interface 704. The network interface 704 can also store data directly to the computer-readable memory 710. The computer processor 702 can communicate to and from the computer-readable memory 710, execute instructions and process data in the computer readable memory 710, etc.

The computer readable memory 710 may include computer program instructions that the computer processor 702 executes in order to implement one or more embodiments. The computer readable memory 710 can store an operating system 712 that provides computer program instructions for use by the computer processor 702 in the general administration and operation of the computing system 700. The computer readable memory 710 can further include computer program instructions and other information for implementing aspects of the present disclosure.

In some embodiments, the graphics processor 714 can include graphics memory such as random access memory ("RAM"). The graphics memory may include a NN and/or computer program instructions that the graphics processor 714 executes in order to implement one or more embodiments. For example, in one embodiment, the graphics memory may include a neural network training module 716 that performs the process 300 described above (or portions thereof) to obtain, generate, or otherwise process training data 718 and train neural networks with the obtained, generated, or otherwise processed training data. In some embodiments, the training data 718 currently being processed by the NN may also be stored in the graphics memory, while the remainder of the training data can be stored in some other location, such as memory 710, a computer-readable medium drive 706, a network-accessible data store, etc. As another example, the graphics memory may include a neural network processing module 720 that performs the process 700 described above (or portions thereof) to process the neural networks trained by, for example, the neural network training module 716. In some implementations, the computing system 700 can include both the neural network training module 716 and the neural network processing module 720. In some implementations, the computing system 700 can include one of the neural network training module 5716 or the neural network processing module 720. In some embodiments, multiple computing systems 700 may communicate with each other via their respective network interfaces 704, and can implement neural network training or processing separately (e.g., each computing system 700 may execute one or more separate instances of the processes 300 and/or 400), in parallel (e.g., each computing system 700 may execute a portion of a single instance of a process 300 and/or 400), etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more hardware-based processors programmed by the executable instructions to at least:
   obtain training data comprising a training data input vector and a corresponding reference data output vector, wherein the training data input vector comprises a first quantity of values, and wherein the reference data output vector comprises a second quantity of values;
   generate an encoded training data input vector using the training data input vector and a plurality of mapping functions of a probabilistic data structure, wherein the encoded training data input vector comprises a representation of the training data input vector having a third quantity of values that is less than the first quantity of values;
   generate an encoded reference data output vector using the corresponding reference data output vector and a plurality of mapping functions of the probabilistic data structure, wherein the encoded reference data output vector comprises a representation of the corresponding reference data output vector having a fourth quantity of values that is less than the second quantity of values;
   obtain an artificial neural network configured to receive, as input, an input vector comprising the third quantity of values and generate, as output, an output vector comprising the fourth quantity of values;
   generate an encoded training data output vector using the artificial neural network and the encoded training data input vector;
   compute a difference between the encoded training data output vector and the encoded reference data output vector;
   compute a gradient based on the difference between the encoded training data output vector and the encoded reference data output vector;
   update a parameter of the artificial neural network using the gradient;
   obtain an input vector;
   generate an encoded input vector using the input vector, wherein the encoded input vector comprises a compressed representation of the input vector having fewer values than the input vector;
   generate an encoded output vector using the artificial neural network and the encoded input vector, wherein the encoded output vector comprises compressed representation of an output vector having fewer values than the encoded output vector;
   generate a first value of a value space using a product of a subset of values of the encoded output vector; and
   compute a probability of purchase for an item using the first value.

2. The system of claim 1, wherein the encoded training data output vector comprises a Bloom-filter-encoded training data output vector or a count-min-sketch-encoded training data output vector.

3. The system of claim 1, wherein the instructions to compute the difference between the encoded training data output vector and the encoded reference data output vector comprise instructions to compute the difference using a loss function.

4. The system of claim 3, wherein the loss function comprises a cross-entropy loss function, a L2 Euclidean loss function, a logistic loss function, a hinge loss function, a square loss function, a softmax loss function, a logistic regression loss function, or a combination thereof.

5. A computer-implemented method comprising:
   under control of a computer system comprising one or more hardware processors configured to execute specific computer-executable instructions,
   obtaining training data comprising a training data input vector and a corresponding reference data output vector, wherein the training data input vector comprises a first quantity of elements, and wherein the reference data output vector comprises a second quantity of elements;
   generating an encoded training data input vector using a plurality of mapping functions of a probabilistic data structure and the training data input vector, wherein the encoded training data input vector comprises a third quantity of elements that is less than the first quantity of elements;
   generating an encoded reference data output vector using the plurality of mapping functions of the probabilistic data structure and the reference data output vector, wherein the encoded reference data output vector comprises a fourth quantity of elements that is less than the second quantity of elements;
   obtaining a machine learning model configured to receive, as input, an input vector comprising the third quantity of elements and generate, as output, an output vector comprising the fourth quantity of output elements; and
   training the machine learning model using the encoded training data input vector and the encoded reference data output vector.

6. The computer-implemented method of claim 5, wherein training the machine learning model using the encoded training data input vector and the encoded reference data output vector comprises:
   generating an encoded training data output vector using a classification machine learning model;
   computing a difference between the encoded training data output vector and the encoded reference data output vector; and
   updating a parameter of the classification machine learning model using the difference.

7. The computer-implemented method of claim 5, wherein training the machine learning model comprises training at least one of: a neural network, a linear regression model, a logistic regression model, a decision tree, a support vector machine, a Naïve Bayes network, a k-nearest neighbors (KNN) model, a k-means model, a random forest model, or a combination thereof.

8. The computer-implemented method of claim 5, wherein generating the encoded training data input vector using the plurality of mapping functions of the probabilistic data structure and the training data input vector comprises generating the encoded training data input vector using a plurality of mapping functions of a Bloom filter or a count-min sketch.

9. The computer-implemented method of claim 5, wherein generating the encoded training data input vector using the plurality of mapping functions of the probabilistic data structure and the training data input vector comprises using a plurality of hash functions of the probabilistic data structure.

10. The computer-implemented method of claim 9, wherein generating the encoded training data input vector using the plurality of hash functions comprises using at least one of: a string-based hash function, a non-cryptographic hash function, or a MurmurHash.

11. The computer-implemented method of claim 5, wherein generating the encoded training data input vector using the plurality of mapping functions of the probabilistic data structure and the training data input vector comprises generating the encoded training data input vector comprising a plurality of integers using the plurality of mapping functions of the probabilistic data structure and the training data input vector.

12. The computer-implemented method of claim 5, wherein generating the encoded training data input vector using the plurality of mapping functions of the probabilistic data structure and the training data input vector comprises generating the encoded training data input vector comprising a plurality of non-negative real numbers using the plurality of mapping functions of the probabilistic data structure and the training data input vector.

13. A system comprising:
computer-readable memory storing executable instructions; and
one or more processors programmed by the executable instructions to at least:
    obtain an input vector that corresponds to a first output vector, wherein the first output vector comprises a plurality of binary values;
    generate a second output vector using the input vector and a machine learning model,
        wherein the second output vector comprises a plurality of analog values,
        wherein the plurality of analog values comprises a compressed representation of the plurality of binary values, and
        wherein the second output vector has fewer dimensions than the first output vector;
    determine a subset of the plurality of analog values using one or more mapping functions of a probabilistic data structure; and
    generate a binary value of the plurality of binary values using the subset of the plurality of analog values.

14. The system of claim 13, wherein an analog value of the plurality of analog values comprises a non-integer value.

15. The system of claim 13, wherein the one or more processors are further programmed by the executable instructions to at least compute an intermediate value using the subset of the plurality of analog values, wherein the binary value is generated based at least partly on the intermediate value.

16. The system of claim 13, wherein the one or more processors are further programmed by the executable instructions to at least compare individual analog values of the subset of the plurality of analog values, wherein the binary value is generated based at least partly on comparing the individual analog values.

17. The system of claim 13, wherein the compressed representation comprises a Bloom filter or a count min sketch.

18. The system of claim 13, wherein the one or more mapping functions comprise a string-based hashing function, a non-cryptographic hash function, or a MurmurHash.

19. The system of claim 13, wherein the input vector comprises a first acquisition history of a user during a time period.

20. The system of claim 13, wherein the machine learning model comprises a neural network, a linear regression model, a logistic regression model, a decision tree, a support vector machine, a Naïve Bayes network, a k-nearest neighbors (KNN) model, a k-means model, or a random forest model.

* * * * *

UNITED STATES PATENT AND TRADEMARK OFFICE
CERTIFICATE OF CORRECTION

PATENT NO. : 10,970,629 B1
APPLICATION NO. : 15/442453
DATED : April 6, 2021
INVENTOR(S) : Leo Parker Dirac It is certified that error appears in the above-identified patent and that said Letters Patent is hereby corrected as shown below:

In the Specification

In Column 9, Line 24, delete "1V)." and insert --N).--.

In the Claims

In Column 28, Claim 17, Line 23 (Approx.), delete "count min" and insert --count-min--.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*